UNITED STATES PATENT OFFICE.

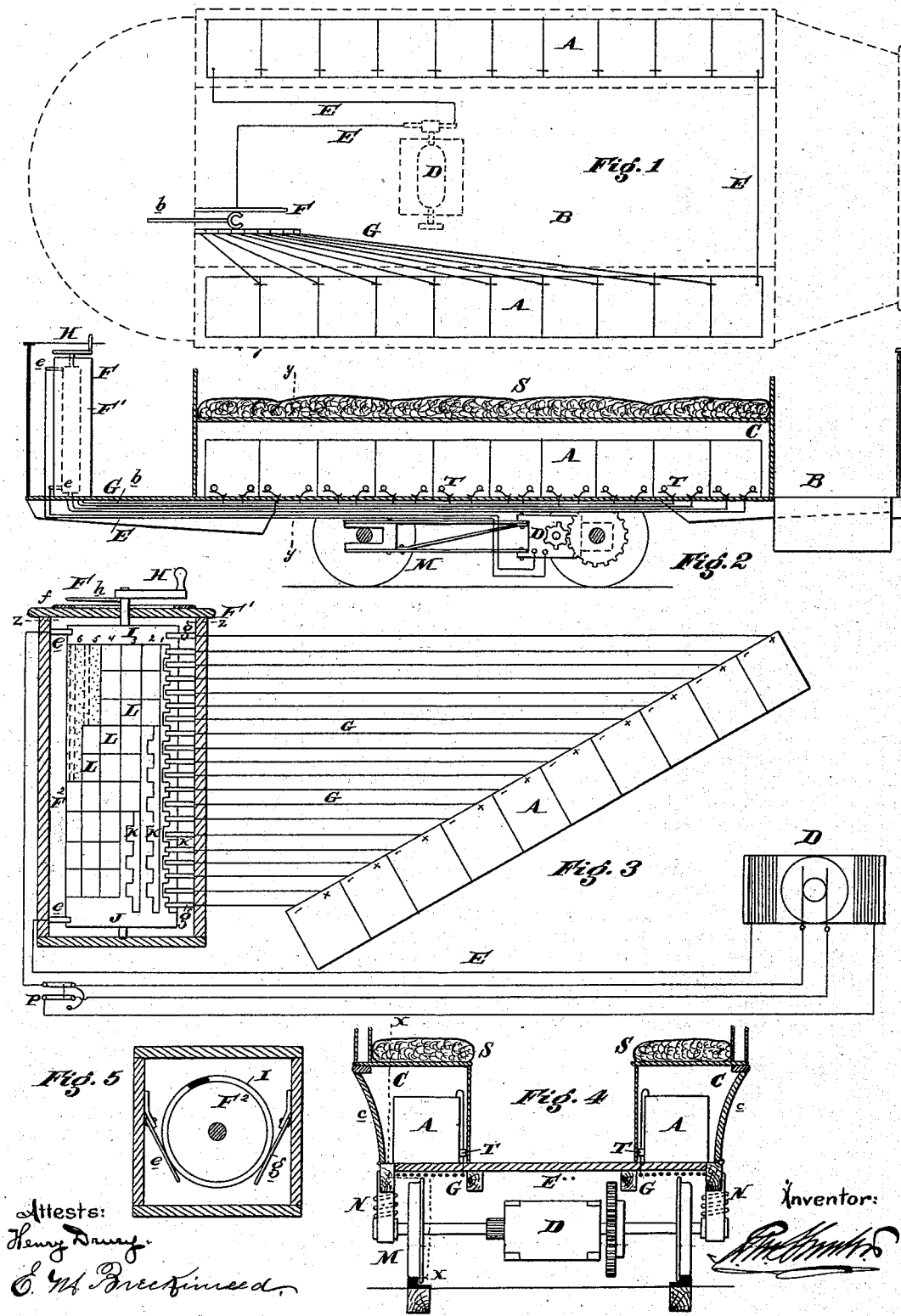

RUDOLPH M. HUNTER, OF PHILADELPHIA, PENNSYLVANIA.

ELECTRIC RAILWAY.

SPECIFICATION forming part of Letters Patent No. 384,912, dated June 19, 1888.

Original application filed January 20, 1888, Serial No. 261,402. Divided and this application filed May 8, 1888. Serial No. 273,207.

(No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, which are fully set forth in the following specification and shown in the accompanying drawings, which form part thereof.

This is a division of my application No. 261,402, filed January 20, 1888.

My invention has particular reference to electrically-propelled cars or other vehicles in which the source of energy is carried upon the car in the form of batteries of any suitable description. Those which I prefer to use are known as "secondary batteries" or "accumulators;" but this invention, broadly considered, is not so limited. In practice I couple the motors and batteries in either of two systems, one of which contemplates the coupling of the batteries in different orders or connections, so as to modify their relative connections, as more fully hereinafter set out, and the other of which contemplates the use of the batteries in series and to simply modify the connections with the coils on the motors, leaving the connections of the batteries *per se* always the same. There may be a combination of these two methods of regulation, if desired; but it is not found necessary in practice. The former of these methods is carried out in the construction forming the subject-matter of this application.

In carrying out my invention there are several ways in which the batteries may be coupled, viz: The cells may all be connected in series and one cell at a time cut out or into circuit, or the cells may all be coupled from series connection to multiple connection, or a combination of these two. It is also evident that many other combinations are possible; but these will suffice to make my invention clear.

The battery-cells are preferably placed under the seats in compartments and supported by the car-body on springs. The regulator is arranged within operative position of the operator on the front platform or other equivalent operative position. The motor is preferably supported by the axle and independent of the car-body, though this is not absolutely necessary. However, in practice I have found it preferable. Circuits connect with the battery-cells and lead the current to the regulator, and thence to the motor, and it is desirable to make such circuits practically fixed upon the car and preferably under the floor-level, yet high up from the ground or road-bed. The batteries or cells are arranged above the floor-level, and may connect with these circuits automatically while being placed within the compartment.

I do not limit myself to mere details of construction, as it is evident that they may be modified in various ways without in the least departing from the spirit of the invention.

In the drawings, Figure 1 is a plan view showing one method of coupling up batteries on a car embodying my invention. Fig. 2 is a longitudinal section of a street-car on line *x x* of Fig. 4, showing the arrangement of motor, batteries, regulator, and circuits on the car. Fig. 3 is a general view showing construction of one form of regulator and connections with batteries and motor. Fig. 4 is a cross-section of an electric car on line *y y* of Fig. 2, and Fig. 5 is a cross section of my regulator, shown in Fig. 3 on line *z z*.

A represents the batteries or cells, which may be of any construction, size, or shape; but the type of battery preferred is what is known as the "secondary battery" or "electrical accumulator." These batteries are preferably arranged in line in any numbers found desirable for the purpose, and may be placed in the compartments C under the seats S of the car B, and which compartments may be provided with doors *c*, as shown in Fig. 4. The car body is provided with the usual front or operator's platform, *b*, and is also supported upon the truck M by springs N in any of the well-known manners.

D is the electric motor, which is preferably supported by the axles and independently of car-body. By this means the car-body, with its load of batteries, may rise and fall, and without jarring the batteries, while the car runs over irregular places in the road-bed, and, furthermore, the same bearing which supports the car-body is made to support the batteries also.

E is the motor-circuit, which connects the motor D with the regulator F upon the front platform, and a circuit-reverser, P, may be used to reverse the current in the armature to reverse the motor.

G are the battery-circuits, which connect the different cells with the regulator F. This regulator may be constructed in various ways, the form shown in Fig. 3 being, perhaps, the most desirable. In this case the terminals from the various batteries end in contact-brushes $g$, which work in contact with a cylinder, $F^2$, having its surface covered by conducting-sections K and L, or combinations of these. The sections K couple the batteries in multiple for a current of large volume and small electro-motive force, while sections L couple the batteries in series for smaller volume of current but high electro-motive force.

There are six sets of sections shown, viz: first, coupling batteries in multiple for large volume and small electro-motive force; second, in coupling batteries part in multiple and part in series for smaller current and higher electro-motive force; third, same as second, only for still smaller current and higher electro-motive force; fourth, coupling batteries all in series for still smaller current but higher electro-motive force; fifth, coupling batteries in series with three cells cut out, reducing power of battery; and, sixth, same as fifth with five cells cut out.

Continuous strips I and J are arranged on the respective ends for contact with the extreme positive and negative brushes $g$, and also for contact with the motor-circuit E by brushes $e$. This regulator is securely located within an insulated chamber or box, F', to be out of danger and to protect persons from contact with it, and an insulated handle, H, and pointer $h$ are used to rotate it and indicate upon a scale, $f$, what connection is made. At one position this regulator cuts the motor entirely out of circuit, and at the same time cuts the batteries out of circuit also.

The circuits G and E are preferably arranged close up to the bottom of the car to be out of the way, (see Figs. 2 and 4,) and the batteries should be made with contacts T to automatically couple with the circuits G by the mere act of inserting them on the car.

The motor is preferably on the rear axle, and hence the circuits G E are looped, or forward and return circuits, and the circuit E must have flexibility or equivalent connection to allow the car-body to rise and fall without breaking its continuity.

Any matters herein set out but not claimed are not dedicated to the public, but form subject-matter of other applications. For instance, the broad invention of batteries on the car with a regulator to vary the power of the batteries by coupling them in different ways or cutting out part of the batteries forms subject-matter of my application No. 261,402, of 1888, of which this is a division. Neither do I claim the arrangement of the batteries over the wheels in compartments on the car, nor such batteries made removable, with provision for automatically coupling them up upon inserting them in position on the car, as these matters form subject-matter of my applications No. 271,923 and 272,123, of 1888.

Having now described my invention, what I claim as new, and desire to secure by Letters Patent, is—

1. The combination of a car-body having compartments under its seats for batteries, a series of batteries arranged upon the car above the floor-level, a regulator to modify the coupling up of said batteries, arranged within reach of the operator upon the front platform, an electric motor to propel the car, and a series of circuits leading from the batteries to the regulator, arranged below and close to the floor of the car-body.

2. The combination of a car-body having compartments for electric batteries, a series of removable batteries, a motor to propel the car, electric circuits fixed below and close to the car-body for coupling up the motor with the batteries, a regulator arranged in said circuit, and detachable connections between the circuits and batteries.

3. The combination of a car-body of an electric car supported upon the truck by springs, with freedom of vertical movement, a series of removable batteries on the car-body, an electric motor under the car-body and connected with the axle of the car, a regulator for the motor on the front platform of the car, and with freedom of vertical movement with respect to the motor, and a looped circuit or circuits fixed to the car, extending from the batteries forward to the regulator, and then back to the motor, with capability of allowing the car-body, batteries, and regulator to rise and fall without breaking the electrical connection with the motor.

In testimony of which invention I hereunto set my hand.

RUDOLPH M. HUNTER.

Witnesses:
E. M. BRECKINREED,
ERNEST HOWARD HUNTER.